(12) United States Patent
He et al.

(10) Patent No.: US 12,314,042 B2
(45) Date of Patent: May 27, 2025

(54) ADAPTIVE-LEARNING INTELLIGENT SCHEDULING UNIFIED COMPUTING FRAME AND SYSTEM FOR INDUSTRIAL PERSONALIZED CUSTOMIZED PRODUCTION

(71) Applicant: ZHEJIANG UNIVERSITY, Hangzhou (CN)

(72) Inventors: Zaixing He, Hangzhou (CN); Yue Chao, Hangzhou (CN); Dongsheng Yang, Hangzhou (CN); Zhile Yang, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 407 days.

(21) Appl. No.: 17/781,370

(22) PCT Filed: Nov. 13, 2020

(86) PCT No.: PCT/CN2020/128622
§ 371 (c)(1),
(2) Date: May 31, 2022

(87) PCT Pub. No.: WO2022/099596
PCT Pub. Date: May 19, 2022

(65) Prior Publication Data
US 2022/0413455 A1 Dec. 29, 2022

(51) Int. Cl.
*G05B 19/418* (2006.01)
*G05B 13/02* (2006.01)
(Continued)

(52) U.S. Cl.
CPC ..... *G05B 19/41865* (2013.01); *G05B 13/027* (2013.01); *G06F 18/2155* (2023.01); *G06F 18/217* (2023.01)

(58) Field of Classification Search
CPC ............ G05B 19/41865; G05B 13/027; G06F 18/2155; G06F 18/217
See application file for complete search history.

(56) References Cited

U.S. PATENT DOCUMENTS

2001/0049595 A1* 12/2001 Plumer .................. G06Q 10/04
703/22
2011/0224816 A1 9/2011 Perera

FOREIGN PATENT DOCUMENTS

| CN | 104951425 | 9/2015 |
|----|-----------|--------|
| CN | 110737529 | 1/2020 |

(Continued)

*Primary Examiner* — Michael W Choi
(74) *Attorney, Agent, or Firm* — Jiwen Chen; Joywin IP Law PLLC (57) ABSTRACT

An adaptive-learning intelligent scheduling unified computing frame and system for industrial personalized customized production that are based on a deep neural network and reinforcement learning. An optimization algorithm is selected by automatic decision-making for a global customized production task with an industrial big data module at the bottom as an information basis, and a global optimal static scheduling plane is generated; a current dynamic event is monitored in real time; if not monitored, the global optimal static plan is executed sequentially; when a dynamic event impact requiring dynamic scheduling optimization is monitored, information of the current dynamic event is interpreted and classified, and corresponding optimization algorithms are automatically selected for dynamic scheduling optimization; and a dynamic scheduling scheme is evaluated by a subsequent module, an optimization scheme is regenerated or a most suitable optimization algorithm is automatically decided, and an equipment deployment sequence is generated for an automatic deployment.

8 Claims, 7 Drawing Sheets

(51) Int. Cl.
*G06F 18/21* (2023.01)
*G06F 18/214* (2023.01)

(56) References Cited

FOREIGN PATENT DOCUMENTS

| | | |
|---|---|---|
| CN | 111199272 | 5/2020 |
| CN | 111882215 | 11/2020 |

* cited by examiner

ADAPTIVE-LEARNING INTELLIGENT SCHEDULING UNIFIED COMPUTING FRAME AND SYSTEM FOR INDUSTRIAL PERSONALIZED CUSTOMIZED PRODUCTION

This is a U.S. national stage application of PCT Application No. PCT/CN2020/128622 under 35 U.S.C. 371, filed Nov. 13, 2020 in Chinese, all of which is hereby incorporated by reference.

BACKGROUND OF THE INVENTION

1. Technical Field

The present invention belongs to the field of scheduling of industrial personalized customized production systems, and particularly relates to an adaptive-learning intelligent scheduling unified computing frame and system for industrial personalized customized production.

2. Description of Related Art

Background arts relating to the present invention are provided here, and are not necessarily constitute the prior art.

Nowadays, with the rise of the intelligent manufacturing technology, industrial developed countries have gradually realized the broad prospects of the manufacturing industry, and the government of China has issued Made in China 2025 to guide economic transformation and development and has constructed intelligent manufacturing systems to promote the development of the manufacturing industry. Personalized customized production is an extremely important mode of intelligent manufacturing. In a personalized customized production task, users participate in the production process of products to obtain highly-personalized commodities customized by themselves or products or services fitting personal requirements. With the development of economy and the increase of people's requirements for diversified consumption, personalized customized services have gradually become the mainstream choice of customers.

Personalized customized production is featured by quick changes of production demands, a complicated customized process flow, the high frequency of diversified dynamic events, a large amount of customization information, and difficult collaborative operation of different devices. The inventors found that traditional unified computing frames for personalized customized production often adopt a unified scheduling optimization method for optimization in the face of different production requirements, which cannot adapt to the high discreteness and complexity and the large number and high frequency of dynamic events in the personalized customized production process. In actual applications, traditional unified computing frames and systems for personalized customized production are not intelligent enough, production scheduling plans and scheduling optimization objectives have to be manually made in the face of complicated and diversified customization information, and existing personalized customized production lines only liberate repetitive physical labor, but fail to release mental labor. In view of this, it is necessary to introduce a dynamic event classification-based optimization strategy in the production process on the basis of existing computing frames and systems to further improve the intelligent degree of personalized customized production.

SUMMARY OF THE INVENTION

The object of the present invention is to overcome the defects of the prior art by providing an adaptive-learning intelligent scheduling unified computing frame and system for industrial personalized customized production, which adopt two steps in the three aspects of static scheduling planning, dynamic scheduling planning and equipment deployment to adapt to the features of complicated procedures, a large amount of customization information, and many categories and high frequency of dynamic events during personalized customized production, that is, targeted optimization is performed after classification, such that the optimization efficiency and effect are improved, the level of intelligence of personalized customized production is further improved; an intelligent decision chain is formed, such that labor costs are minimized; and in view of the large amount of customization information and the difficulty of collaborative operation of equipment, micro strategy modeling is adopted to improve the coordination between equipment and modules for personalized customized production.

To fulfill the above object, the present invention adopts the following technical solution:

S1: reading, by a system, information in a real-time updated industrial big data module; before production, generating, by an optimal static scheduling planning module in the system, an optimal static scheduling plan according to customization task information, equipment information and material information in the real-time updated industrial big data module; and when production is started, invoking, by the system, a dynamic event interpreting module to dynamically monitor an event queue until a processable dynamic event is read;

S2: automatically classifying dynamic events by the dynamic event interpreting module based on a deep reinforcement learning technique according to data information in the industrial big data module, generating classification labels, and deciding specific contents of a corresponding optimization objective and constraint according to the classification labels;

S3: automatically receiving an optimization objective decision scheme generated in S2, automatically selecting different optimization algorithms based on the deep reinforcement learning technique according to the classification labels and the optimization objective and constraint, selecting a suitable method to optimize parameters of the algorithms until the corresponding optimization objective and constraint are met, and forming a final dynamic scheduling optimization scheme, by a dynamic scheduling optimization module;

S4: automatically receiving the dynamic scheduling optimization scheme generated in S3, evaluating the optimization scheme in the aspects of efficiency, energy consumption, deployment complexity and stability by means of a deep neural network to obtain a score of the optimization scheme, optimizing an equipment scheduling deployment in a spatial scale if the score is higher than a score standard, automatically selecting a corresponding deployment optimization algorithm based on the optimization scheme generated in S3 according to the current industrial production condition and the equipment distribution condition of a production line, and generating an equipment scheduling sequence, by a scheduling deployment and evaluation module; and S5: performing an automatic deployment by the system according to the deployment sequence generated in S4, receiving equipment scheduling change information in real time by the industrial big data module, and updating the current industrial production environment, such that a multi-module collaborative dynamic decision chain is formed by four modules of the frame provided by the present invention, and decision-making in the whole process is completed by a computer without participation of workers; and after one cycle is completed, the system avoids the influence of a current dynamic event, continuously adopts the optimized optimal static plan and invokes the dynamic event interpreting module to dynamically monitor the event queue to repeat the step S2 through the step S5 until all personalized customized production task are completed.

The optimal static scheduling planning module is used for acquiring information provided by the industrial big data module, extracting features of an industrial production environment by semi-supervised learning based on the deep neural network, performing training in terms of information labeled in advance and other non-labeled information to enable a semi-supervising model to regress to learn how to classify information according to features to allow the system to decide corresponding static objective weight parameters and constraints in different production environments, and selecting a most suitable static optimization algorithm according to decision contents, such that the system is adaptable to different complicated conditions during personalized customized production, and an advanced offline generation method is adopted in the whole process, such that an optimal static plan of a global production task is obtained before operation of the production line. The system comprises a static optimization algorithm library containing multiple classic static optimization algorithms including a quality prediction method, an optimization algorithm, a heuristic method, a maximum inherit algorithm, a genetic algorithm and derivative algorithms thereof, users are able to update the algorithm library according to personal requirements and features of an actual production environment, and after the algorithm library is updated, the system takes personal algorithms of the users into account in the decision-making process.

Static objectives include a shortest maximum completion time, lowest energy consumption and a lowest production cost, and decision of the static objectives mainly comprises analyzing and optimizing a comprehensive weight of multiple static objectives and generating a static multi-objective comprehensive weight parameter.

The optimal static scheduling plan is a scheduling planning scheme, in conformity with the shortest maximum completion time, the lowest energy consumption and the lowest production cost from the macroscopic aspect, generated based on a global personalized customized production task. An optimization algorithm of the optimal static scheduling plan is independently decided and selected according to the current environment and the personalized customized production task and is an important constituent part of intelligent production line macro strategy modeling put forward by the present invention.

The dynamic event interpreting module is used for monitoring production data information provided by the industrial big data module, monitoring dynamic events requiring dynamic scheduling optimization, classifying the dynamic events according to contents of the dynamic events based on a deep reinforcement learning technique, enabling an intelligent agent to observe features of the dynamic events in the current environment with current industrial production information as a reinforcement learning environment of the intelligent agent, and setting a corresponding stimulus to enhance dynamic event classification. The classification labels include time deviation of the production line, machine fault, material problem and contract event; and a multi-objective dynamic weight parameter and a corresponding constraint of dynamic scheduling optimization under the current event are automatically decided according to current industrial production environment data provided by the industrial big data module, and an event classification result.

Dynamic objectives include a shortest maximum completion time, lowest energy consumption, a lowest production cost, a highest adjustment flexibility of production plans, and a highest scheduling stability (that is, a lowest variation with respect to the optimal static scheduling plan), and decision of the dynamic objectives mainly comprises analyzing and optimizing a comprehensive weight of multiple dynamic objectives and generating a final dynamic multi-objective comprehensive weight.

The form of the final dynamic multi-objective comprehensive weight is expressed by the following formula:

$$\min Z = \alpha \cdot f_{norm}(T) + \beta \cdot f_{norm}(E) + \gamma \cdot f_{norm}(C) + (1-\delta \cdot f_{norm}(P)) + (1-\varepsilon \cdot f_{norm}(Q))$$

Wherein, $\alpha$ represents a time weight parameter; $\beta$ represents an energy consumption weight parameter; $\gamma$ represents a cost weight parameter; $\delta$ represents a flexibility weight parameter; $\varepsilon$ represents a stability weight parameter; T represents a workshop production time, E represents workshop production energy consumption, C presents a workshop production cost, P represents the flexibility of a scheduling scheme, Q represents the stability of the scheduling scheme, $f_{norm}(\chi)$ represents a normalization function for unifying the dimensions of five indicators including time, energy consumption, cost, flexibility and stability, the value of the function value is between 0 and 1, and values of the weight parameters are also between 0 and 1.

The dynamic scheduling optimization module comprises a dynamic optimization algorithm selection strategy model and an optimization algorithm parameter adaptive learning method. Considering that there are a variety of dynamic events, the rule of which is hard to determine, the system generates the dynamic optimization algorithm selection strategy model by deep reinforcement learning and adaptively matches optimization algorithms and parameter optimization methods by supervised learning.

The dynamic optimization algorithm selection strategy model enables the intelligent agent to observe the difference between optimization results of different optimization algorithms with various optimization algorithms, a current event classification label and a current industrial production environment as a reinforcement learning environment of the intelligent agent, sets a corresponding stimulus to enhance optimization algorithm selection, and decides dynamic scheduling optimization algorithms corresponding to different dynamic events according to different conditions. The system comprises a dynamic optimization algorithm library containing multiple classic dynamic optimization algorithms including a multi-agent algorithm, a simulated annealing algorithm, a hybrid particle swarm algorithm, a tabu search algorithm, a genetic algorithm and variants thereof, users are able to update the algorithm library according to personal requirements and features of the actual production environment, and after the algorithm library is updated, the system takes personal algorithms of the users into account in the decision-making process.

According to the present invention, features of different optimization algorithms are extracted by deep learning, specifically by supervised learning based on the deep neural network, to automatically classify the optimization algorithms, and a suitable parameter optimization method is selected from the parameter optimization algorithm library. Users are able to update the parameter optimization algorithm library, and the system is able to automatically extract personal algorithm features for classification.

The scheduling deployment and planning module comprises an adaptive scheme evaluation strategy based on deep reinforcement learning, calculates the score of a received optimization scheme, and performs a next scheduling deployment when the score is higher a specified score threshold. In the deployment process, features of the production environment and the scheduling scheme are extracted by deep learning, with the current industrial production environment and scheduling scheme as an environment, with reference to the static scheduling scheme or dynamic scheduling scheme generated in the previous step in terms of the current industrial production environment information, and weight parameters and relevant constraints of a current deployment optimization objective are independently decided by reinforcement learning, a suitable optimization algorithm is selected, and a deployment sequence is generated finally. The system comprises a deployment optimization algorithm library containing multiple classic equipment deployment optimization algorithms including an adaptive genetic algorithm, an ant colony optimization algorithm, a multi-objective genetic algorithm, a particle swarm algorithm and derivative algorithms thereof, users are able to update the algorithm library according to personal requirements and features of the actual production environment, and after the algorithm library is updated, the system takes personal algorithms of the users into account in the decision-making process.

According to the present invention, optimization objectives taken into account in the deployment optimization process mainly include transport expenditure, equipment delay expenditure, production capacity, and deployment complexity, and the system provided by the present invention mainly makes decision on the weight proportions of multiple optimization objectives.

The real-time updated industrial big data module comprises all data information generated and monitored in the actual industrial production process, including dynamic event information, material information, production equipment information, personalized customized production task information, and current factory operating information.

The multi-module collaborative dynamic decision chain is a closed-loop decision route formed by the industrial big data module capable of receiving external data in real time, the dynamic event interpreting module, the dynamic scheduling optimization module and the scheduling deployment and evaluation module of the unified computing frame provided by the present invention, and all decision-making tasks are automatically completed by the computer in the whole process if no advanced decision instruction is manually sent. By means of the closed-loop decision chain, the unified computing frame provided by the present invention is able to complete automatic planning and deployment of equipment and procedures on an intelligent production line only by receiving data.

The micro strategy modeling refers to considering the operation and optimization of the intelligent production line from the production environment of a whole factory rather than only focusing on the current procedure or event, and still paying attention to the whole production environment and the personalized customized production task in the process of handing a random dynamic event, and includes micro strategy modeling in the aspect of production tasks and micro strategy modeling in the aspects of production factors.

The micro strategy modeling in the aspect of production tasks means that the whole frame automatically selects a static optimization algorithm according to a global production task provided by users after task initialization, and generates an optimal static plan based on the global production task, and the optimal static plan will be referred in subsequent local dynamic scheduling optimization and adjustment to minimize a change to the global optimal static plan to ensure that the whole frame is able to take the global production task into account in the operating process.

The micro strategy modeling in the aspect of production factors means that information in the industrial big data module is updated in real time in the operating process of the computing frame, and other modules uses current information at any time, wherein the information includes all information of the production environment of the whole factory; the frame provided by the present invention is not confined to information of devices or procedures involved in the current event, but also refers to information of the whole current production environment, thus taking the influence on other production procedures and devices into account.

Considering the features of complicated produces, a large amount of customization information, and the high frequency of diversified dynamic events in personalized customized production, two steps are adopted in the three aspects of static scheduling planning, dynamic scheduling planning and equipment deployment, that is, targeted optimization is performed after classification.

According to the present invention, in view of the features of the high occurrence frequency of diversified dynamic events in personalized customized production, targeted optimization is performed after classification in the three aspects of static scheduling planning, dynamic scheduling planning and equipment deployment based on deep learning, and the fully-automatic adaptive-learning intelligent unified computing frame for personalized customized production is put forward in combination with various deep neural network adaptive learning technique including deep reinforcement learning, semi-supervised learning and supervised learning.

By adoption of the above technical solution, the present invention has the following beneficial effects:

The unified computing frame and system provided by the present invention adopt multiple steps for static scheduling optimization, dynamic scheduling optimization and equipment deployment optimization, and can select different optimization algorithms for optimization in the face of static scheduling optimization tasks and planning deployment tasks in different cases, thus improving the optimization efficiency and effect.

Considering the low intelligence level and high labor cost of manual decision of traditional personalized customized production lines, the multi-module collaborative closed-loop intelligent decision chain provided by the present invention can realize fully-automation operation of personalized customized production lines without external advanced manual intervention.

In addition, the present invention puts forwards a micro strategy model that takes the global production tasks and production data into account in the scheduling process, thus improving the coordination of the modules and equipment in the frame and being more suitable for complicated and diversified personalized customized production tasks.

BRIEF DESCRIPTION OF THE SEVERAL VIEWS OF THE DRAWINGS

Drawings constituting one part of the application are provided to gain a further understanding of the application. Illustrative embodiments of the application and descriptions thereof are used to explain the application, and are not intended to limit the present invention.

DETAILED DESCRIPTION OF THE INVENTION

It should be point out that the following detailed descriptions are merely illustrative and are intended to further describe the application. Unless otherwise specified, all technical and scientific terms used in this specification have meanings commonly understood by those ordinarily skilled in the technical field to which the application belongs.

The present invention will be described in further detail below in conjunction with the accompanying drawings. It should be understood that the specific embodiments described below are merely used to explain the present invention, and are not intended to limit the present invention.

Figure 1:
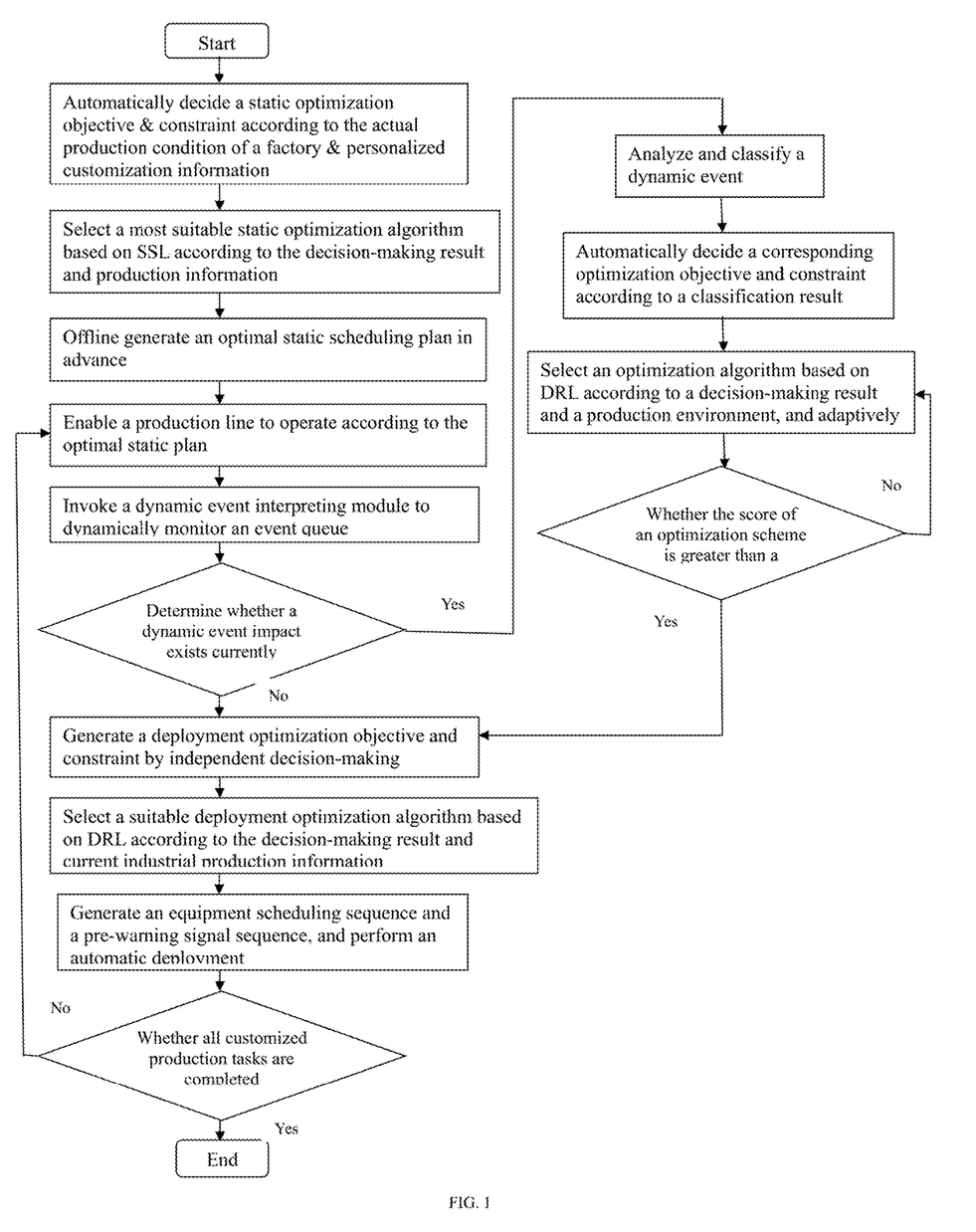
FIG. 1 is an operation flow diagram of a system of the present invention.
Figure 2:
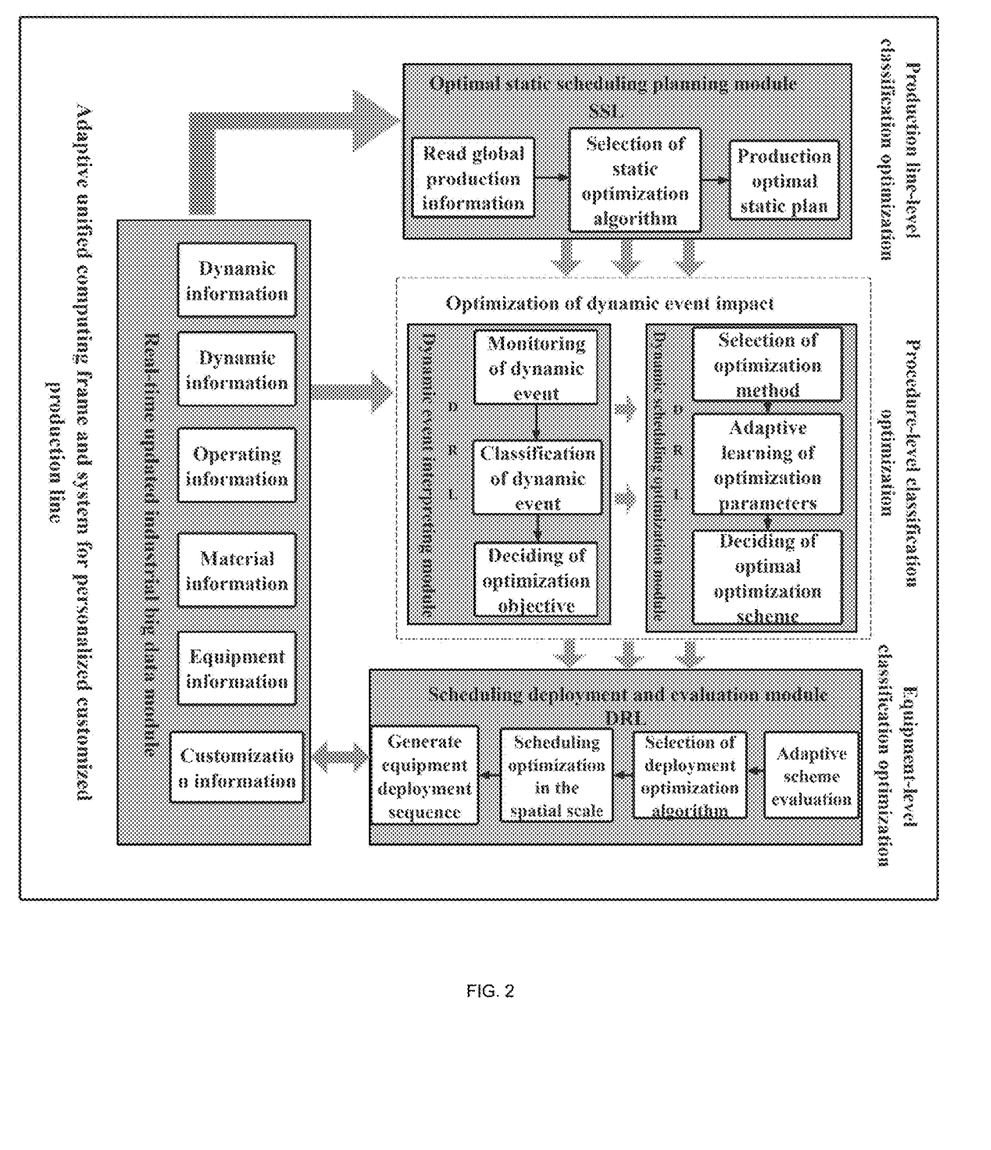
FIG. 2 is a frame model diagram of the present invention.

Referring to FIG. 1, the machine implementation process of an embodiment implemented according to a complete method of the present invention is as follows:

In view of the defects of a complicated process flow, a large amount of customized production information, the high frequency of diversified dynamic events, and a low degree of intelligence of existing production lines, the present invention establishes an adaptive-learning intelligent scheduling unified computing frame and system for personalized customized production. As show in FIG. 2, the frame is mainly consisted of the following five modules:

An optimal static scheduling planning module for generating a static optimization objective and constraint by independent decision-making according to an industrial production environment and a personalized customized production task, selecting a suitable algorithm from a static optimization algorithm library, and offline generating a global optimal static scheduling plan before production;

A dynamic event interpreting module for dynamically monitoring an event sequence in the production process, generating different classification labels according to dynamic event information, and independently deciding a corresponding optimization objective and constraint based on a classification result;

A dynamic scheduling optimization module for automatically selecting a corresponding optimization method according to the optimization objective and constraint generated by the dynamic event interpreting module to obtain a better optimization effect under the precondition of meeting the optimization objective and constraint, and adaptively learning optimization parameters by a deep learning technique and generating a final optimization scheme on the basis of selecting a corresponding optimization method;

A scheduling deployment and evaluation module for receiving and evaluating the optimization scheme generated by the dynamic scheduling optimization module, performing scheduling deployment optimization if an evaluation result meets conditions, and generating a deployment sequence; and A real-time updated industrial big data module comprising factory data including dynamic event information, operating information, material information, equipment information and customization task information, serving as a medium for collaborative work of the modules, and providing a data basis for other modules.

The technical route of the frame provided by the present invention is as follows:

S1: a system reads information in the real-time updated industrial big data module; before production, the optimal static scheduling planning module in the system generates an optimal static scheduling plane according to the customization task information, equipment information and material information in the real-time updated industrial big data module; and when production is started, the system invokes the dynamic event interpreting module to dynamically monitor an event queue until a processable dynamic event is read.

Figure 3:
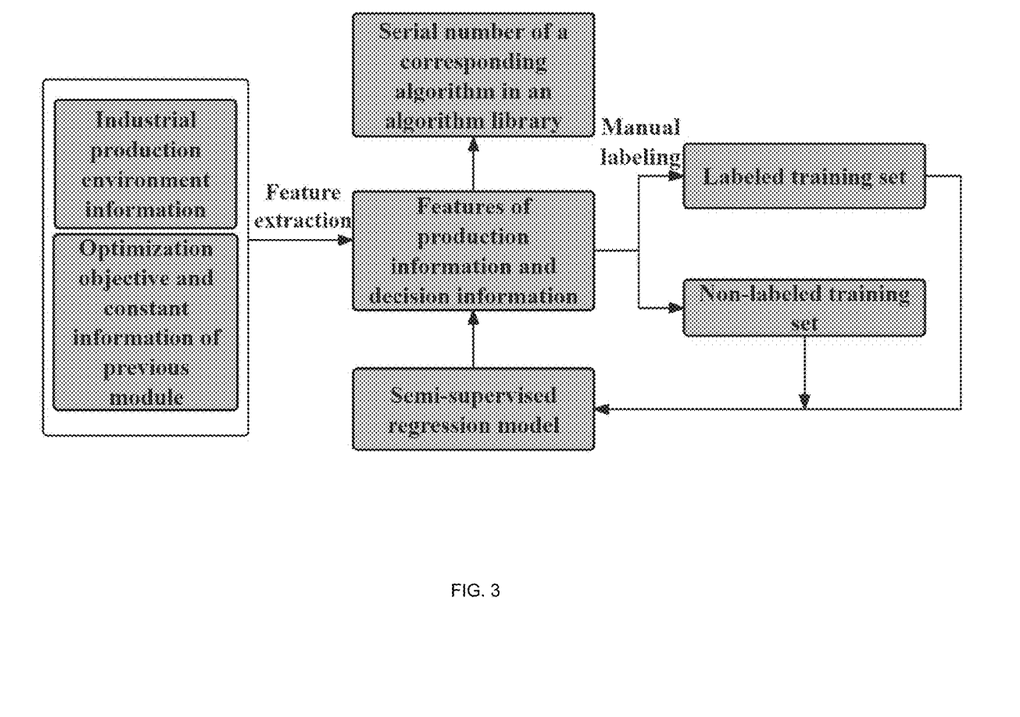
FIG. 3 is a principle diagram of an SSL-based static optimization algorithm.

Specifically, in this step, when the frame of the present invention starts to operate, relevant information is interpreted first, features of the industrial production environment are extracted by semi-supervised learning based on a deep neural network, training is performed by combining information labeled in advance and other non-labeled information to enable a semi-supervised model to regress to learn how to classify information according to the features, a classification result is the serial number of a corresponding algorithm, and the principle diagram is shown in FIG. 3; a static optimization objective and constraint are independently decided according to the actual production condition and the personalized customized production task to select a suitable static optimization algorithm, and an optimal static scheduling plan is generated according to a global production task; and in case of no disturbance from a dynamic event in the production process, a production line will operate according to the optimal static plan. In the operating process, the dynamic event interpreting module monitors dynamic events in the production process in real time. The next step is performed when a processable dynamic event is monitored.

Static objectives include a shortest maximum completion time, lowest energy consumption and a lowest production cost, and the decision of the static objectives comprises analyzing and optimizing a comprehensive weight of multiple static objectives and generating a static multi-objective comprehensive weight parameter.

S2: based on a deep reinforcement learning technique, the dynamic event interpreting module automatically classifies dynamic events in terms of data information in the industrial big data module to generate classification labels, and specific contents of a corresponding optimization objective and constraint are decided according to the classification labels.

Figure 4:
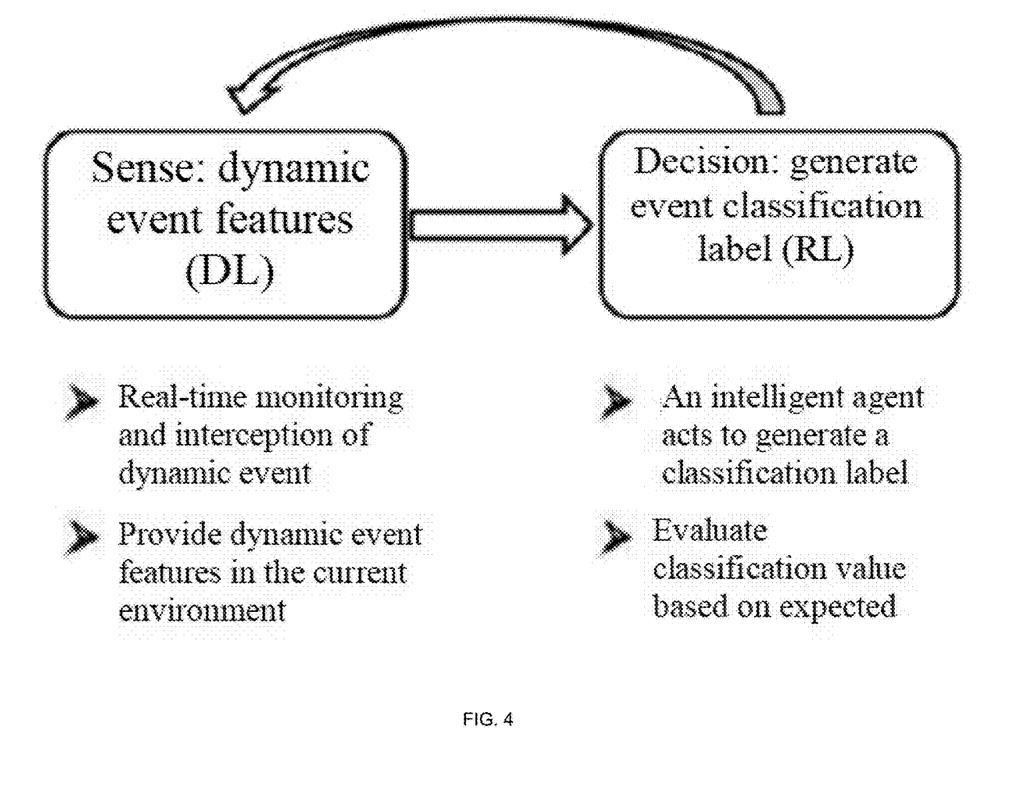
FIG. 4 is a principle diagram of DRL-based dynamic event classification.

Specifically, in this step, considering the diversified types of dynamic events in the personalized customized production process, when a processable dynamic event is monitored, the monitored dynamic event is interpreted first; then, as shown by the principle model diagram in FIG. 4, an intelligent agent is enabled to observe the features of the dynamic event in the current environment based on the deep reinforcement learning technique with current industrial production information as a reinforcement learning environment of the intelligent agent, and a corresponding stimulus is set to enhance the dynamic event classification. Classification labels of the events are generated by interpreting the features of the dynamic events, wherein the labels comprise time deviation of the production line, machine fault, material problem, contract event, and the like; or, multiple labels are generated synchronously in one dynamic event. In this step, a multi-objective dynamic optimization weight parameter and a corresponding constraint are automatically decided in conjunction with the generated labels and information of the current industrial production condition. A dynamic optimization equation and a constraint equation constitute a dynamic scheduling optimization scheme.

The form of the multi-objective dynamic comprehensive weight may be expressed as the following formula:

$$\min Z = \alpha \cdot f_{norm}(T) + \beta \cdot f_{norm}(E) + \gamma \cdot f_{norm}(C) + (1-\delta \cdot f_{norm}(P)) + (1-\varepsilon \cdot f_{norm}(Q))$$

Wherein, $\alpha$ represents a time weight parameter; $\beta$ represents an energy consumption weight parameter; $\gamma$ represents a cost weight parameter; $\delta$ represents a flexibility weight parameter; $\varepsilon$ represents a stability weight parameter; T represents a workshop production time, E represents workshop production energy consumption, C presents a workshop production cost, P represents the flexibility of a scheduling scheme, Q represents the stability of the scheduling scheme, $f_{norm}(\chi)$ represents a normalization function for unifying the dimensions of five indicators including time, energy consumption, cost, flexibility and stability, the value of the function value is between 0 and 1, and values of the weight parameters are also between 0 and 1.

S3: the dynamic scheduling optimization module automatically receives the optimization objective decision scheme generated in S2, automatically selects different optimization algorithms based on the deep reinforcement learning technique according to the classification labels and the optimization objective and constraint, and selects a suitable method to optimize the parameters of the algorithms until the corresponding optimization objective and constraint are met, such that a final dynamic scheduling optimization scheme is formed.

Figure 5:
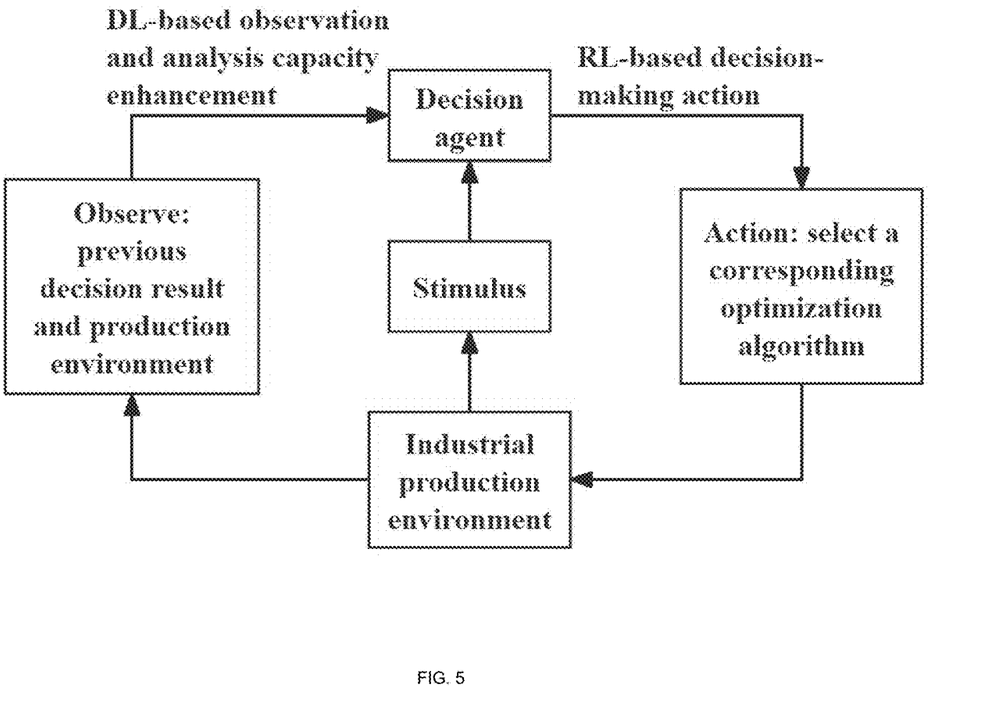
FIG. 5 is a selection principle diagram of a DRL-based optimization algorithm.

Specifically, in this step, after the optimization scheme generated in the previous step is received, a corresponding optimization algorithm is selected by a dynamic optimization algorithm selection strategy model, the principle diagram of which is shown in FIG. 5; the intelligent agent is enabled to observe the difference between optimization results of different optimization algorithms, with the current event classification label and industrial production information as a reinforcement learning environment of the intelligent agent, and a corresponding stimulus is set to enhance optimization algorithm selection, such that the objective of deciding dynamic scheduling optimization algorithms corresponding to different categories of dynamic events according to different conditions is fulfilled.

Figure 6:
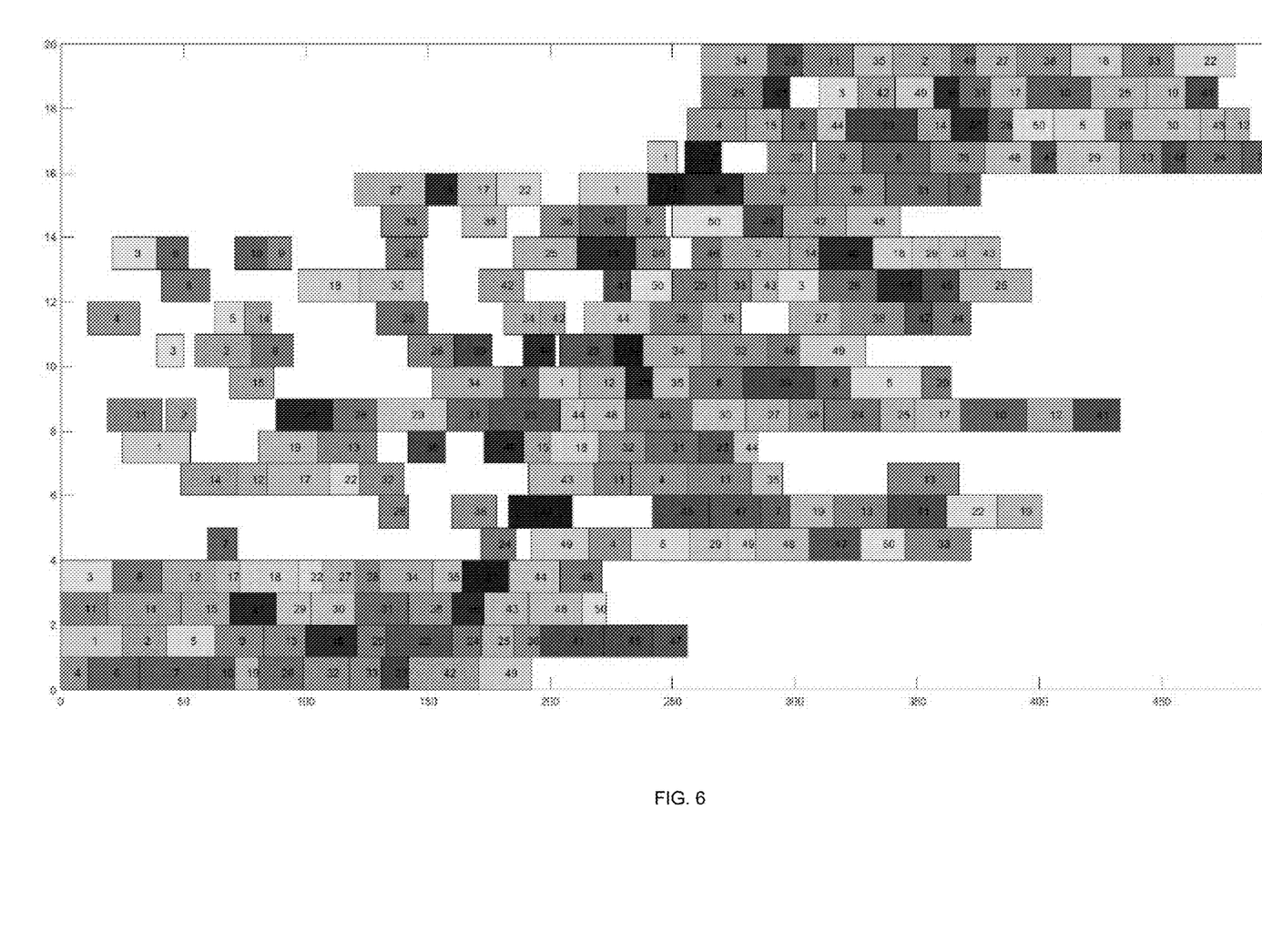
FIG. 6 is a Gantt diagram of optimization result examples.

In this step, features of different optimization algorithms are extracted by supervised learning based on a deep neural network to automatically classify the optimization algorithms, and a suitable parameter optimization method is selected from a parameter optimization algorithm library. Users can update the parameter optimization algorithm library, and the system can automatically extract personal algorithm features to classify the algorithms; and finally, the parameters of the optimization algorithms are optimized, and a final dynamic scheduling optimization scheme is generated. The Gantt diagram of corresponding optimization examples is shown in FIG. 6.

S4: the scheduling deployment and evaluation module automatically receives the dynamic scheduling optimization scheme generated in S3, evaluates the optimization scheme by a deep neural network, and obtains the score of the optimization scheme by calculation in the aspects of efficiency, energy consumption, deployment complexity and stability; if the score of the optimization scheme is higher than a score standard, an equipment scheduling deployment is optimized in the spatial scale; and a corresponding deployment optimization algorithm is selected automatically based on the optimization scheme generated in the previous step according to the current industrial production condition and the equipment distribution condition of the production line, and an equipment scheduling sequence is generated.

Specifically, in this step, after the dynamic scheduling optimization scheme generated in the previous step is acquired, the scheduling deployment and evaluation module grades the optimization scheme in the aspects of efficiency, energy consumption, planning and deployment flexibility and the variation stability with respect to the optimal static scheduling scheme by means of an adaptive evaluation scheme generated by independent decision-making; if the score exceeds a score threshold, optimization in equipment deployment is performed on the dynamic scheduling optimization scheme; in the deployment process, as shown by the principle diagram in FIG. 5, features of the production environment and the scheduling scheme are extracted by deep learning with reference to the generated static scheduling scheme or dynamic scheduling scheme according to current industrial production environment information by means of the deep reinforcement learning technique, with the current industrial production environment and scheduling scheme as an environment, weight parameters and relevant constraints of the current deployment optimization objective are automatically decided by the reinforcement learning method, a suitable optimization algorithm is selected, and a deployment sequence is generated finally.

S5: the system performs an automatic deployment according to the deployment sequence generated in S4, and the industrial big data module receives equipment deployment change information in real time to update the current industrial production environment. In this way, the four modules of the frame provided by the present invention form a multi-module collaborative dynamic decision chain, and decision-making in the whole process is completed by a computer without manual participation. After one cycle is completed, the system avoids the influence of the current dynamic event, continuously adopts the optimized optimal static plan, and invokes the dynamic event interpreting module to dynamically monitor the event queue to repeat S2 to S5 until all personalized customized production tasks are completed.

Figure 7:
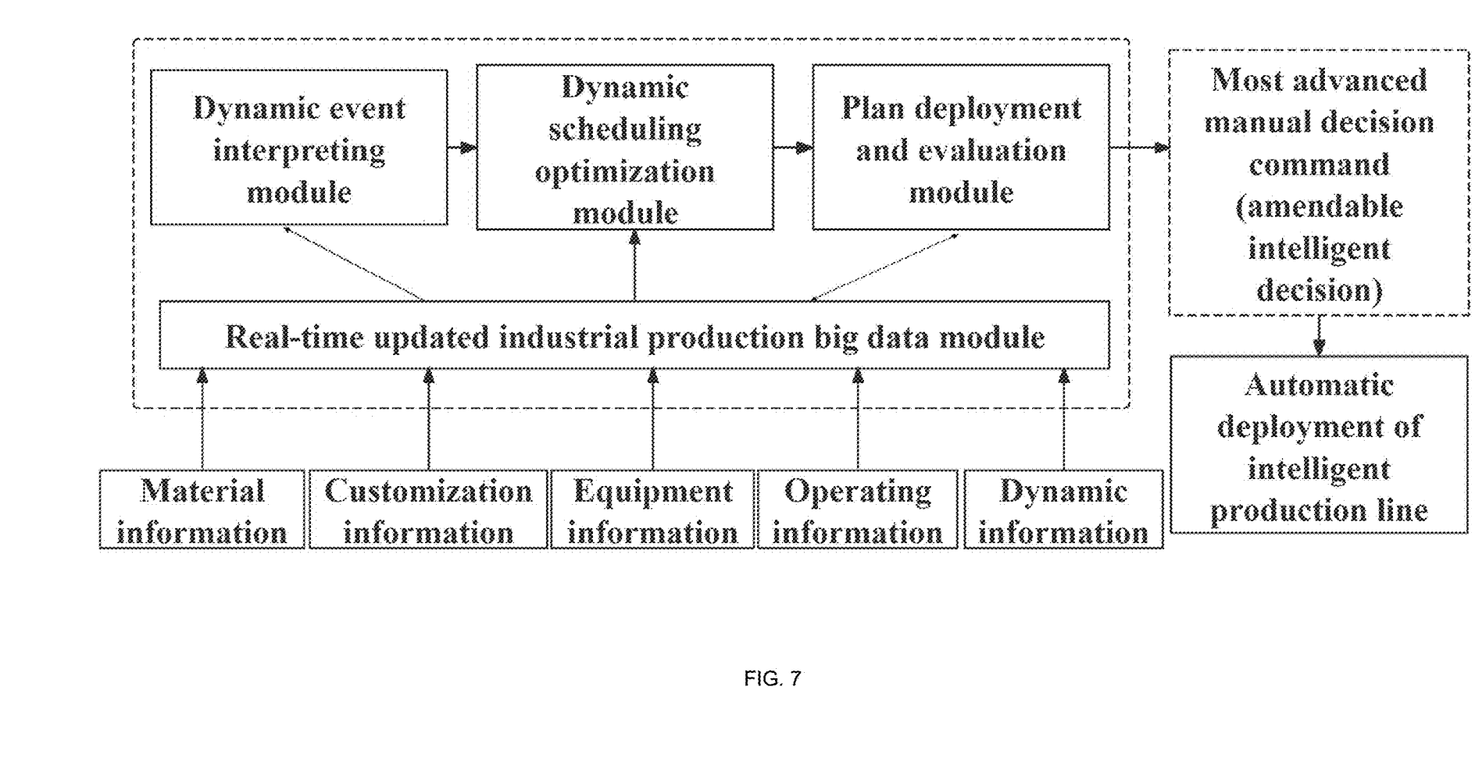
FIG. 7 is a schematic diagram of multi-module collaborative closed-loop decision chain.

Specifically, in this step, after the equipment deployment sequence is obtained, an automatic deployment is performed, and change information of the current production condition is updated into the industrial big data module in real time, such that a multi-module collaborative dynamic decision chain from the industrial big data module, the dynamic event interpreting module, the dynamic optimization scheduling module, the scheduling deployment and evaluation module to the industrial big data module is formed; and as shown in FIG. 7, a closed-loop decision route is constructed, and all decision-making tasks are automatically completed by the computer in the whole process if no advanced decision instruction is sent manually. By means of the closed-loop decision chain, the level of intelligence of the production line is improved, the labor intensity of manual decision of the production line is relieved, and the frame can better adapt to the complicated process flow and diversified dynamic disturbances in personalized customized production.

In the above embodiment, a micro strategy model for personalized customized production is established in the two aspects of production tasks and production data by establishing the global optimal static plan and updating the industrial big data module in real time, such that the system can better adapt to the features of difficult collaborative operation of equipment and a large amount of production task information of personalized customized production.

According to this embodiment, considering the features of complicated produces, a large amount of customization information, and the high frequency of diversified dynamic events in personalized customized production, multiple steps are adopted in the aspects of static scheduling planning, dynamic scheduling planning and equipment deployment, that is, targeted optimization is performed after classification, such that the optimization efficiency and effect are improved; and the adaptive-learning intelligent scheduling unified computing frame for industrial personalized customized production can effectively improve the efficiency of industrial personalized customized production and minimize labor costs.

The above embodiments are merely specific ones of the present invention, and are not intended to limit the technical features of the present invention. Any simple variations, equivalent substitutions or embellishments made based on the present invention to solve basically identical technical problems and fulfill basically identical technical effects should also fall within the protection scope of the present invention.

What is claimed is:

1. A method based on an adaptive-learning intelligent scheduling unified computing frame and system for industrial personalized customized production, the method comprising the following steps:

S1: the system reading information in a real-time updated industrial big data module; prior to production, an optimal static scheduling planning module in the system generating an optimal static scheduling plan according to customization task information, equipment information and material information in the real-time updated industrial big data module; and when production is started, the system invoking a dynamic event interpreting module to dynamically monitor an event queue until a processible dynamic event is read;

S2: automatically classifying dynamic events by the dynamic event interpreting module based on a deep reinforcement learning technique according to data information in the real-time updated industrial big data module, generating classification labels, and deciding specific contents of a corresponding optimization objective and constraint according to the classification labels;

S3: automatically receiving the corresponding optimization objective and constraint generated in the step S2, automatically selecting different optimization algorithms based on the deep reinforcement learning technique according to the classification labels and the corresponding optimization objective and constraint, selecting a method to optimize parameters of the algorithms until the corresponding optimization objective and constraint are met, and forming a final dynamic scheduling optimization scheme, by a dynamic scheduling optimization module;

S4: automatically receiving the final dynamic scheduling optimization scheme generated in the step S3, evaluating the final dynamic scheduling optimization scheme in the aspects of efficiency, energy consumption, deployment complexity and stability by means of a deep neural network to obtain a score of the final dynamic scheduling optimization scheme, optimizing an equipment scheduling deployment if the score is higher than a score standard, automatically selecting a corresponding deployment optimization algorithm based on the final dynamic scheduling optimization scheme generated in the step S3, and generating an equipment scheduling sequence, by a scheduling deployment and evaluation module; and S5: performing an automatic deployment by the system according to the equipment deployment sequence generated in the step S4, receiving equipment scheduling change information in real time by the real-time updated industrial big data module, such that a multi-module collaborative dynamic decision chain is formed by four modules of the frame including the real-time updated industrial big data module, the dynamic event interpreting module, the dynamic scheduling optimization module and the scheduling deployment and evaluation module, and decision-making in a whole process is completed by a computer without participation of workers; and after one cycle is completed, the system continuously adopts an optimized optimal static plan and invokes the dynamic event interpreting module to dynamically monitor an event queue to repeat the step S2 through the step S5 until customization tasks are completed.

2. The method according to claim 1, wherein the optimal static scheduling planning module is used for acquiring information provided by the real-time updated industrial big data module, extracting features by semi-supervised learning based on the deep neural network, performing training in terms of information labeled in advance and other non-labeled information to enable a semi-supervising model to regress to learn how to classify information according to features to allow the system to decide corresponding static objective weight parameters and constraints in different production environments, and selecting a static optimization algorithm according to decision contents, such that the system is adaptable to different complicated conditions during personalized customized production, and an advanced offline generation method is adopted in the whole process, such that an optimal static plan of a global production task is obtained before operation of the production line; the system comprises a static optimization algorithm library containing multiple classic static optimization algorithms including a quality prediction method, an optimization algorithm, a heuristic method, a maximum inherit algorithm, a genetic algorithm and derivative algorithms thereof, users are able to update the algorithm library according to personal requirements and features of an actual production environment, and after the algorithm library is updated, the system takes personal algorithms of the users into account in the decision-making process;

static objectives include a shortest maximum completion time, lowest energy consumption and a lowest production cost, and decision of the static objectives mainly comprises analyzing and optimizing a comprehensive weight of multiple static objectives and generating a static multi-objective comprehensive weight parameter;

the optimal static scheduling plan is a scheduling planning scheme, in conformity with the shortest maximum completion time, the lowest energy consumption and the lowest production cost from the macroscopic aspect, generated based on a global personalized customized production task; an optimization algorithm of the optimal static scheduling plan is independently decided and selected according to the current environment and the personalized customized production task and is an important constituent part of intelligent production line macro strategy modeling.

3. The method according to claim 2, wherein the multi-module collaborative dynamic decision chain is a closed-loop decision route formed by the real-time updated industrial big data module capable of receiving external data in real time, the dynamic event interpreting module, the dynamic scheduling optimization module and the scheduling deployment and evaluation module of the unified computing frame, and all decision-making tasks are automatically completed by the computer in the whole process if no advanced decision instruction is manually sent; and by means of the closed-loop decision chain, the unified computing frame is able to complete automatic planning and deployment of equipment and procedures on an intelligent production line only by receiving data.

4. The method according to claim 2, wherein the micro strategy modeling refers to considering the operation and optimization of an intelligent production line from the production environment of a whole factory rather than only focusing on the current procedure or event, and still paying attention to the whole production environment and the personalized customized production task in the process of handing a random dynamic event, and includes micro strategy modeling in the aspect of production tasks and micro strategy modeling in the aspects of production factors;

the micro strategy modeling in the aspect of production tasks means that the whole frame automatically selects a static optimization algorithm according to a global production task provided by users after task initialization, and generates an optimal static plan based on the global production task, and the optimal static plan will be referred in subsequent local dynamic scheduling optimization and adjustment to minimize a change to the global optimal static plan to ensure that the whole frame is able to take the global production task into account in the operating process;

the micro strategy modeling in the aspect of production factors means that information in the real-time updated industrial big data module is updated in real time in the operating process of the computing frame, and other modules uses current information at any time, wherein the information includes all information of the production environment of the whole factory; and the frame provided is not confined to information of devices or procedures involved in the current event, but also refers to information of the whole current production environment, thus taking the influence on other production procedures and devices into account.

5. The method according to claim 1, wherein the dynamic event interpreting module is used for monitoring production data information provided by the real-time updated industrial big data module, monitoring dynamic events requiring dynamic scheduling optimization, classifying the dynamic events according to contents of the dynamic events based on a deep reinforcement learning technique, enabling an intelligent agent to observe features of the dynamic events in the current environment with current industrial production information as a reinforcement learning environment of the intelligent agent, and setting a corresponding stimulus to enhance dynamic event classification; the classification labels include time deviation of the production line, machine fault, material problem and contract event; a multi-objective dynamic weight parameter and a corresponding constraint of dynamic scheduling optimization under the current event are automatically decided data provided by the real-time updated industrial big data module, and an event classification result;

dynamic objectives include a shortest maximum completion time, lowest energy consumption, a lowest production cost, a highest adjustment flexibility of production plans, and a highest scheduling stability (that is, a lowest variation with respect to the optimal static scheduling plan), and decision of the dynamic objectives mainly comprises analyzing and optimizing a comprehensive weight of multiple dynamic objectives and generating a final dynamic multi-objective comprehensive weight;

the form of the final dynamic multi-objective comprehensive weight is expressed by the following formula:

$$\min Z = \alpha \cdot f_{norm}(T) + \beta \cdot f_{norm}(E) + \gamma \cdot f_{norm}(C) + (1 - \delta \cdot f_{norm}(P)) + (1 - \varepsilon \cdot f_{norm}(Q))$$

wherein, $\alpha$ represents a time weight parameter; $\beta$ represents an energy consumption weight parameter; $\gamma$ represents a cost weight parameter; $\delta$ represents a flexibility weight parameter; $\varepsilon$ represents a stability weight parameter; T represents a workshop production time, E represents workshop production energy consumption, C presents a workshop production cost, P represents the flexibility of a scheduling scheme, Q represents the stability of the scheduling scheme, $f_{norm}(\chi)$ represents a normalization function for unifying the dimensions of five indicators including time, energy consumption, cost, flexibility and stability, the value of the function value is between 0 and 1, and values of the weight parameters are also between 0 and 1.

6. The method according to claim 1, wherein the dynamic scheduling optimization module comprises a dynamic optimization algorithm selection strategy model and an optimization algorithm parameter adaptive learning method; considering that there are a variety of dynamic events, the rule of which is hard to determine, the system generates the dynamic optimization algorithm selection strategy model by deep reinforcement learning and adaptively matches optimization algorithms and parameter optimization methods by supervised learning;

the dynamic optimization algorithm selection strategy model enables the intelligent agent to observe the difference between optimization results of different optimization algorithms with various optimization algorithms, a current event classification label as a reinforcement learning environment of the intelligent agent, sets a corresponding stimulus to enhance optimization algorithm selection, and decides dynamic scheduling optimization algorithms corresponding to different dynamic events according to different conditions; and the system comprises a dynamic optimization algorithm library containing multiple classic dynamic optimization algorithms including a multi-agent algorithm, a simulated annealing algorithm, a hybrid particle swarm algorithm, a tabu search algorithm, a genetic algorithm and variants thereof, users are able to update the algorithm library according to personal requirements and features of the actual production environment, and after the algorithm library is updated, the system takes personal algorithms of the users into account in the decision-making process;

features of different optimization algorithms are extracted by deep learning, specifically by supervised learning based on the deep neural network, to automatically classify the optimization algorithms, and a parameter optimization method is selected from the parameter optimization algorithm library; and the users are able to update the parameter optimization algorithm library, and the system is able to automatically extract personal algorithm features for classification.

7. The method according to claim 1, wherein the scheduling deployment and planning module comprises an adaptive scheme evaluation strategy based on deep reinforcement learning, calculates the score of a received optimization scheme, and performs a next scheduling deployment if the score is higher a specified score threshold; in the deployment process, features of the production environment and the scheduling scheme are extracted by deep learning, with the scheduling scheme as an environment, with reference to the static scheduling scheme or dynamic scheduling scheme generated in the previous step, and weight parameters and relevant constraints of a current deployment optimization objective are independently decided by reinforcement learning, an optimization algorithm is selected, and a deployment sequence is generated finally; the system comprises a deployment optimization algorithm library containing multiple classic equipment deployment optimization algorithms including an adaptive genetic algorithm, an ant colony optimization algorithm, a multi-objective genetic algorithm, a particle swarm algorithm and derivative algorithms thereof, users are able to update the algorithm library according to personal requirements and features of the actual production environment, and after the algorithm library is updated, the system takes personal algorithms of the users into account in the decision-making process; and optimization objectives taken into account in the deployment optimization process mainly include transport expenditure, equipment delay expenditure, production capacity, and deployment complexity, and the system mainly makes decision on weight proportions of multiple optimization objectives.

8. The method according to claim 1, wherein the real-time updated industrial big data module comprises all data information generated and monitored in the actual industrial production process, including dynamic event information, material information, production equipment information, personalized customized production task information, and current factory operating information.

\* \* \* \* \*